United States Patent
Deng

(10) Patent No.: US 10,816,817 B2
(45) Date of Patent: Oct. 27, 2020

(54) MICROLENS ARRAY FILM AND DISPLAY MODULE

(71) Applicant: Wuhan China Star Optoelectronics Technology Co., Ltd., Wuhan, Hubei (CN)

(72) Inventor: Zefang Deng, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 70 days.

(21) Appl. No.: 15/577,406

(22) PCT Filed: Nov. 14, 2017

(86) PCT No.: PCT/CN2017/110764
§ 371 (c)(1),
(2) Date: Nov. 16, 2018

(87) PCT Pub. No.: WO2019/085006
PCT Pub. Date: May 9, 2019

(65) Prior Publication Data
US 2019/0384066 A1 Dec. 19, 2019

(30) Foreign Application Priority Data
Oct. 30, 2017 (CN) .......................... 2017 1 1053519

(51) Int. Cl.
*G02B 30/27* (2020.01)
*G02B 3/00* (2006.01)
*G02B 5/30* (2006.01)

(52) U.S. Cl.
CPC ........... *G02B 30/27* (2020.01); *G02B 3/0056* (2013.01); *G02B 5/3025* (2013.01)

(58) Field of Classification Search
CPC .... G02B 30/27; G02B 3/0056; G02B 5/3025; G02B 30/10; G02B 3/00; G02B 30/00
See application file for complete search history.

(56) References Cited

U.S. PATENT DOCUMENTS

| | | | |
|---|---|---|---|
| 2014/0240475 A1 | 8/2014 | Shigemura | |
| 2014/0361270 A1* | 12/2014 | Cui | ...................... G02B 3/0043 257/40 |

FOREIGN PATENT DOCUMENTS

| | | |
|---|---|---|
| CN | 102566062 A | 7/2012 |
| CN | 105700163 A | 6/2016 |

(Continued)

OTHER PUBLICATIONS

Zhang, "Bore hole 3D display device and bore hole 3D grating", CN 206224061, the machine translation (Year: 2017).*

*Primary Examiner* — Wen Huang
(74) *Attorney, Agent, or Firm* — Hemisphere Law, PLLC; Zhigang Ma

(57) ABSTRACT

The present disclosure discloses a microlens array film including a film-shaped main body layer and a plurality of microlenses arranged on the top of the main body layer, the top surface of the microlens is a cambered surface, and the projected image on the main body layer is rectangular. The disclosure also discloses a display module. The microlens array film of the present disclosure includes a plurality of microlenses arranged in an array, the top surface of the microlens is a cambered surface and has a rectangular projected image on the film like main body layer. The filling ratio of the microlens array reaches 100%, which can fully cover all the sub-pixels. During the 3D display, all the pixel information can be restored in space to avoid the missing of the 3D scene information and ensure the naked eye 3D viewing effect.

6 Claims, 2 Drawing Sheets

(56) References Cited

FOREIGN PATENT DOCUMENTS

| | | |
|---|---|---|
| CN | 106094228 A | 11/2016 |
| CN | 205862023 U | 1/2017 |
| CN | 206224061 U | 6/2017 |

\* cited by examiner

MICROLENS ARRAY FILM AND DISPLAY MODULE

RELATED APPLICATIONS

The present application is a National Phase of International Application Number PCT/CN2017/110764, filed Nov. 14, 2017, and claims the priority of China Application No. 201711053519.6, filed Oct. 30, 2017.

BACKGROUND OF THE INVENTION

1. Field of the Invention

The present disclosure relates to a naked eye 3D technology, and more particularly to a microlens array film and a display module.

2. The Related Arts

The naked eye 3D stereoscopic display provides a good environmental affection, and a strong visual impact for the viewer to create a new immersive visual experience without the need for additional auxiliary viewing devices. It is a new development of an important direction of development.

Dual/multi-view technology, light field display and holographic display are the most popular naked eye 3D display program. The light field display technology is a true 3D stereoscopic display technology. It can reconstruct the 3D scene in space compared with the double and multi-view technologies so that the viewer has a better sense of immersion and the visual fatigue and dizziness are improved effectively. In addition, compared with the holographic display technology, the light field display technology is easier to achieve, and it is gradually becoming a mature 3D display solution in our daily life.

In the light field display device, the microlens array is the main optical structure, which is usually arranged on the light emitting side of the display module. The microlens array is designed and manufactured as a part of the ball lens. It mainly includes the bottom surface and the arc surface, wherein the arc surface is a hemispherical surface and the bottom surface is a circle. The different sub-pixels are covered by each lens form a unit image. In the actual 3D light field display, different unit images are focused and superposed in space through the microlens unit to form a 3D scene. However, the shape of the bottom surface of the microlens unit is circular, the maximum filling ratio of the microlens unit is 78.5%, which cannot cover all the sub-pixels. When displaying, the information displayed by all the pixels cannot be restored in space. This directly leads to the lack of 3D scene information and the 3D viewing effect is seriously affected.

SUMMARY OF THE INVENTION

In view of the shortcomings of the prior art, the present disclosure provides a microlens array film and a display module, which can achieve 100% filling ratio of the microlens unit, completely cover all sub-pixels and avoid missing of the 3D scene information.

In order to achieve the above object, the present disclosure adopts the following technical solutions:

A microlens array film includes a film-shaped main body layer and a plurality of microlenses arranged on the top of the main body layer. The top surface of the microlens is a cambered surface, and the projected image on the main body layer is rectangular.

As an example, the height of each microlenses and the area of the projected image of the microlens on the main body layer are equal.

As an example, the microlens array film further includes a recessed channel formed between the two adjacent microlenses.

As an example, the top surface of the microlens is a part of a spherical surface.

As an example, the focal length of the microlens satisfies:

$$f = \frac{4h^2 + L^2}{8h(n-1)}$$

wherein f is the focal length of the microlens, n is the refractive index of the main body layer, h is the height of the microlens, when a projected image of the top surface of the microlens on the main body layer is rectangular, L is the length of the long side of the bottom surface of the microlens, when a projected image of the top surface of the microlens on the main body layer is square, L is the length of the bottom surface of the microlens.

Alternatively, the top surface of the microlens is a part of a parabola curve.

As an example, the focal length of the microlens satisfies:

$$f = \frac{4h^2 + L^2}{8h(n-1)} - h(n-1)$$

wherein f is the focal length of the microlens, n is the refractive index of the main body layer, h is the height of the microlens, when a projected image of the top surface of the microlens on the main body layer is rectangular, L is the length of the long side of the bottom surface of the microlens, when a projected image of the top surface of the microlens on the main body layer is square, L is the length of the bottom surface of the microlens.

Another object of the present disclosure is to provide a display module including the microlens array film, the display panel and the upper polarizer. The upper surface and the lower surface of the upper polarizer are respectively attached to the lower surface of the main body layer of the microlens array film and the light emitting surface of the display panel.

As an example, the projected image of the opposite side surfaces of the two adjacent microlenses on the display panel is located in a gap between two adjacent sub-pixels.

The microlens array film of the present disclosure includes a plurality of microlenses arranged in an array, the top surface of the microlens is a cambered surface and has a rectangular projected image on the film like main body layer. The filling ratio of the microlens array reaches 100%, which can fully cover all the sub-pixels. During the 3D display, all the pixel information can be restored in space to avoid the missing of the 3D scene information and ensure the naked eye 3D viewing effect.

DETAILED DESCRIPTION OF THE PREFERRED EMBODIMENTS

In order to make the objectives, technical solutions and advantages of the present disclosure more comprehensible, the present disclosure is further described in detail below with reference to the accompanying drawings and embodiments. It should be understood that the specific embodiments described herein are merely used to explain the present disclosure, and are not intended to limit the present disclosure.

Figure 1:
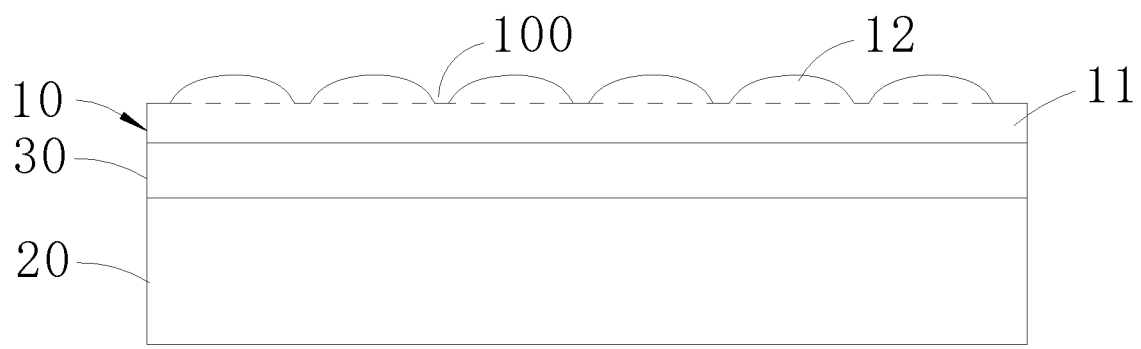
FIG. 1 is a schematic diagram of a laminated structure of a display module according to an embodiment of the present disclosure.

Refer to FIG. 1, the display module of the embodiment of the present disclosure includes a microlens array film 10, a display panel 20 and an upper polarizer 30. The upper polarizer 30 is located between the microlens array film 10 and the display panel 20. The upper surface of the upper polarizer 30 is attached to the lower surface of the main body layer 11 of the microlens array film. The lower surface of the upper polarizer 30 is attached to the light emitting surface of the display panel 20. The circumference of the microlens array film 10 is flush with the end surface of the upper polarizer 30.

The light emitted by the display panel 20 is polarized by the upper polarizer 30 and passing through the microlens array film 10 to the human eye. The images of different sub-pixels are focused by the microlens array film 10 and then superposed in space to form a 3D scene, so as to realize the viewing effect of the naked eye 3D.

Figure 2:
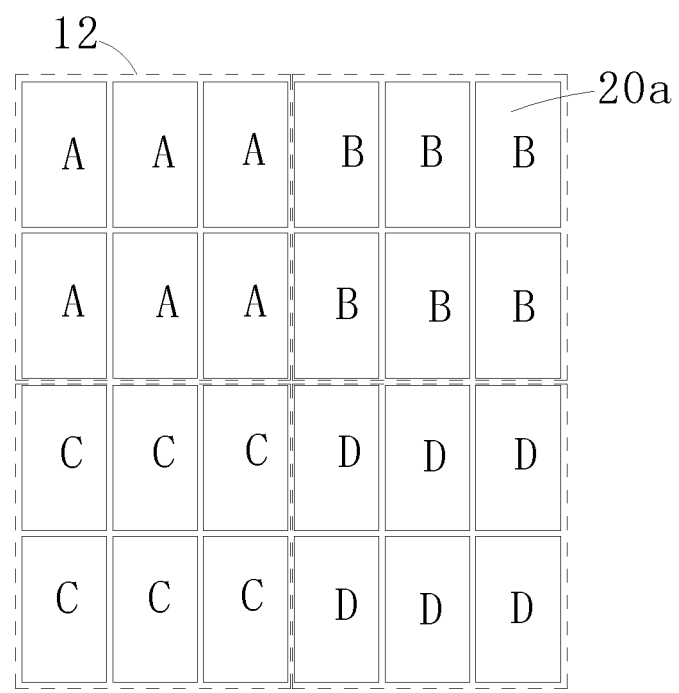
FIG. 2 is a schematic diagram of the arrangement of the microlenses according to the embodiment of the present disclosure.
Figure 3:
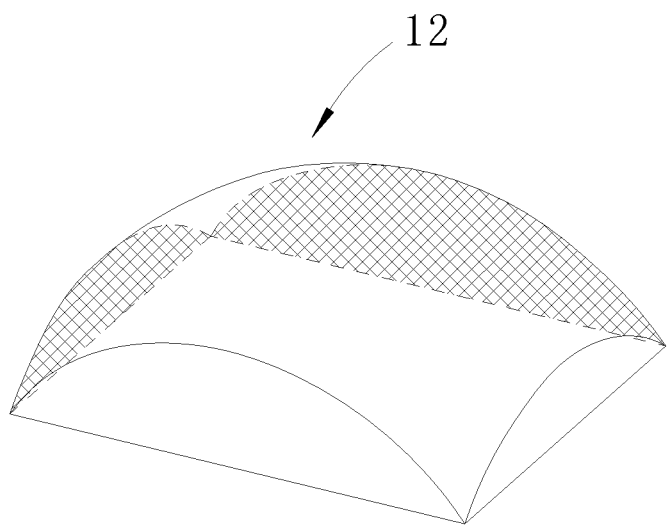
FIG. 3 is a schematic structural diagram of a microlens according to an embodiment of the present disclosure.

Specifically, as shown in FIG. 2 and FIG. 3, the microlens array film 10 in the present embodiment includes a film-shaped main body layer 11 and a plurality of microlenses 12 arranged on the top surface of the main body layer 11. The top surface of the microlens 12 is a cambered surface, and the projected image on the main body layer 11 is rectangular. The height of each microlens 12 and the area of the projected image of the microlens on the main body layer 11 are equal. Preferably, the configuration of each lens 12 is exactly the same so as to achieve a relatively uniform 3D effect as a whole. The material of the microlens array film 10 is polymethylmethacrylate (PMMA), polystyrene (PS) or the like, and has excellent transparency.

As shown in FIG. 2, in the display module, the sub-pixels 20a are arranged in an array. Each of the sub-pixels 20a is arranged at an interval and is shielded by a black matrix. The rectangular projected image of each microlens 12 on the display panel 20 covers a plurality of sub-pixels 20a. The projected image of the opposite side surfaces of the two adjacent microlenses 12 on the display panel 20 is located in the gap between the two adjacent sub-pixels and located in the black matrix area. As shown in FIG. 2, one embodiment shows that the projected image of each microlens 12 is exactly opposite to the six sub-pixels 20a formed in two rows and three columns and the black matrix of the microlens 12 facing the edge of the microlens 12. In FIGS. 2, A, B, C and D respectively represent sub-pixels corresponding to different unit images, and each microlens 12 covers one-unit image. It can be understood that, in other embodiments, the number of sub-pixels corresponding to each microlens is not limited thereto, and may be freely designed according to the size of an actual unit image.

In another embodiment, a recessed channel 100 is formed between the two adjacent microlenses 12. The corresponding side surface of the two adjacent microlenses 12 are parallel to each other. Each side surface of each microlens 12 is perpendicular to the main body layer 11. That is, the side surface of the recessed channel 100 is a vertical plane.

In the other embodiments, the recessed channel 100 may not exist between the two adjacent microlenses 12. Instead, the two adjacent microlenses 12 share the same side surface. The fabrication of the microlens array film in this manner is simpler.

As shown in FIG. 3, the top surface of each microlens 12 is part of a spherical or parabolic surface. When the top surface of the microlens 12 is a part of a spherical surface, the focal length of the microlens 12 satisfies the following formula:

$$f = \frac{R}{n-1} = \frac{4h^2 + L^2}{8h(n-1)}. \quad \text{(formula 1)}$$

wherein f is the focal length of the microlens 12, R is the radius of the spherical surface where the microlens 12 is located, n is the refractive index of the main body layer 11, h is the height of the microlens 12, when a projected image of the top surface of the microlens 12 on the main body layer 11 is rectangular, L is the length of the long side of the bottom surface of the microlens 12, when a projected image of the top surface of the microlens 12 on the main body layer 11 is square, L is the length of the bottom surface of the microlens 12.

When the top surface of the microlens 12 is a part of a parabola curve, the focal length of the microlens 12 satisfies the following formula:

$$f = \frac{4h^2 + L^2}{8h(n-1)} - h(n-1). \quad \text{(formula 1')}$$

Figure 4:
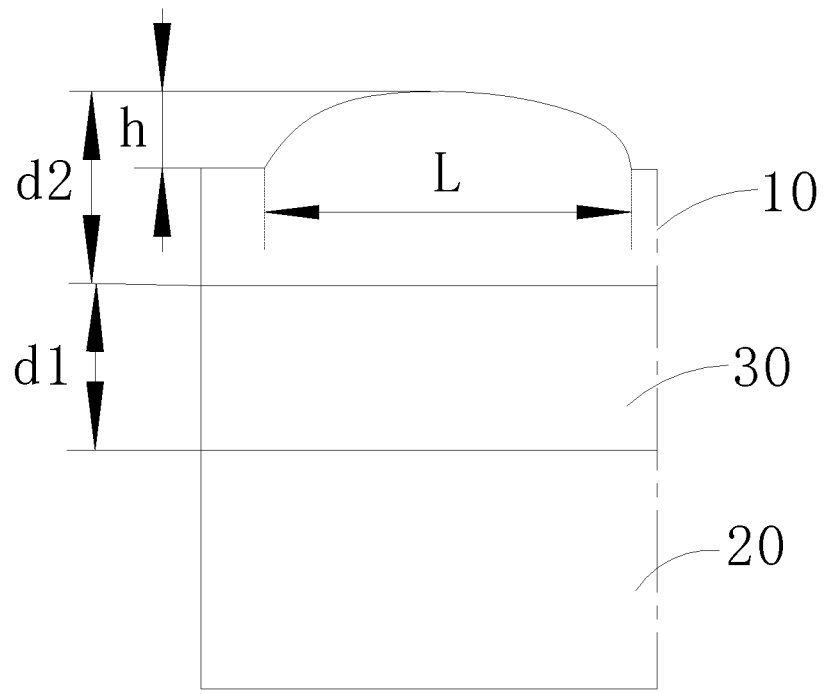
FIG. 4 is a partial structural diagram of a display module according to an embodiment of the present disclosure.

As shown in FIG. 4, the thickness d2 of the microlens array film 10 satisfies the formula:

$$d2 = f - d1 + h. \quad \text{(formula 2)}$$

d1 is the thickness of the upper polarizer 30.

For example, when the length L of the bottom surface of the microlens 12 is 0.5 mm, the height h of the microlens 12 is 0.1 mm, the microlens array film 10 is PMMA, and the corresponding refractive index n is 1.49. When the top surface of the microlens 12 is a part of a spherical surface, the calculated thickness d2 of the microlens array film 10 is about 0.54 mm according to the above formulas 1, 2. When the top surface of the microlens 12 is a part of a parabola curve, the calculated thickness d2 of the microlens array film 10 according to the above formulas 1', 2 is about 0.47 mm.

Through the above design, the present disclosure optimizes and improves the arrangement and the three-dimensional topography of the microlens array, thereby improving the filling ratio of the microlens array so that the filling ratio thereof reaches 100%. Thus, the microlens array can completely cover all the sub-pixels, which can effectively prevent pixel information loss and improve the 3D display effect.

The above descriptions are merely specific implementation manners of the present application. It should be noted that those skilled in the art may make some improvements and modifications without departing from the principle of the present disclosure, these improvements and modifications should also be considered as the scope of the present application.

What is claimed is:

1. A microlens array film comprising a film-shaped main body layer and a plurality of microlenses arranged on a top surface of the main body layer, wherein the top surface of the microlens is arc-shaped, and a projected image of the microlens on the main body layer is rectangular;

wherein heights of the microlenses are equal and areas of projected images of the microlenses on the main body layer are equal; and wherein a top surface of the microlens is a part of a parabola curve;

wherein the microlens array film further comprises a recessed channel formed between the two adjacent microlenses.

2. The microlens array film according to claim 1, wherein a focal length of the microlens satisfies:

$$f = \frac{4h^2 + L^2}{8h(n-1)} - h(n-1)$$

wherein f is the focal length of the microlens, n is the refractive index of the main body layer, h is the height of the microlens, when a projected image of the top surface of the microlens on the main body layer is rectangular, L is the length of the long side of the bottom surface of the microlens, when a projected image of the top surface of the microlens on the main body layer is square, L is the length of the bottom surface of the microlens.

3. A display module comprising a microlens array film, a display panel and an upper polarizer, wherein the microlens array film comprises a film-shaped main body layer and a plurality of microlenses arranged on a top surface of the main body layer, a top surface of the microlens is a cambered surface and a projected image on the main body layer is rectangular, a upper surface and a lower surface of the upper polarizer are respectively attached to a lower surface of the main body layer of the microlens array film and a light emitting surface of the display panel;

wherein heights of the microlenses are equal and areas of projected images of the microlenses on the main body layer are equal; and wherein a top surface of the microlens is a part of a parabola curve.

4. The display module according to claim 3, wherein the projected image of the opposite side surfaces of the two adjacent microlenses on the display panel are located in a gap between two adjacent sub-pixels.

5. The display module according to claim 3, wherein the display module further comprises a recessed channel formed between the two adjacent microlenses.

6. The display module according to claim 3, wherein a focal length of the microlens satisfies:

$$f = \frac{4h^2 + L^2}{8h(n-1)} - h(n-1)$$

wherein f is the focal length of the microlens, n is the refractive index of the main body layer, h is the height of the microlens, when a projection of the top surface of the microlens on the main body layer is rectangular, L is the length of the long side of the bottom surface of the microlens, when a projection of the top surface of the microlens on the main body layer is square, L is the length of the bottom surface of the microlens.

* * * * *